United States Patent [19]
Luo et al.

[11] Patent Number: 6,042,143
[45] Date of Patent: *Mar. 28, 2000

[54] INTEGRATED STEERING WHEEL WITH IMPROVED MANUFACTURING CAPABILITY

[75] Inventors: Guanhong Jason Luo; Bob G. Muse, both of Rochester Hills, Mich.

[73] Assignee: Breed Automotive Technology, Inc., Lakeland, Fla.

[ * ] Notice: This patent is subject to a terminal disclaimer.

[21] Appl. No.: 09/089,165

[22] Filed: Jun. 2, 1998

[51] Int. Cl.⁷ .................................................. B60R 21/16
[52] U.S. Cl. ........................................ 280/731; 280/728.2
[58] Field of Search .................................. 280/731, 728.2

[56] References Cited

U.S. PATENT DOCUMENTS

| | | | |
|---|---|---|---|
| 5,419,585 | 5/1995 | Breed et al. | 280/728.2 |
| 5,470,099 | 11/1995 | Williams | 280/728.2 |
| 5,685,559 | 11/1997 | Cuevas | 280/728.2 |
| 5,685,560 | 11/1997 | Sugiyama et al. | 280/731 |
| 5,692,769 | 12/1997 | Scharboneau et al. . | |
| 5,692,770 | 12/1997 | Scharboneau et al. . | |
| 5,720,494 | 2/1998 | Hosoi et al. | 280/731 |
| 5,727,811 | 3/1998 | Nagata et al. | 280/731 |
| 5,730,459 | 3/1998 | Kanda | 280/731 |
| 5,836,609 | 11/1998 | Coleman | 280/728.3 |
| 5,957,484 | 9/1999 | Levine et al. | 280/728.3 |
| 5,971,430 | 10/1999 | Niwa et al. | 280/731 |

*Primary Examiner*—Lanna Mai
*Assistant Examiner*—Jeffrey J. Restifo
*Attorney, Agent, or Firm*—Lonnie R. Drayer; Beth A. Vrioni

[57] ABSTRACT

The invention relates to a simplified integrated steering wheel assembly and a simplified method for forming the integrated steering wheel assembly. The integrated steering wheel assembly has a one-piece steering wheel armature and an airbag scrim. A cover is molded over a portion of the steering wheel armature and a portion of the airbag scrim. The airbag scrim forms a cavity for placement of an airbag and an airbag inflator between the airbag scrim and a hub portion of the steering wheel armature. The method of the invention includes use of a plurality of positioning pins and a vacuum force to position the airbag scrim relative to the steering wheel armature and mold during the possess of molding the cover over a portion of the steering wheel armature and a portion of the airbag scrim.

8 Claims, 3 Drawing Sheets

INTEGRATED STEERING WHEEL WITH IMPROVED MANUFACTURING CAPABILITY

BACKGROUND OF THE INVENTION

This invention relates generally to steering wheel assemblies and, more particularly, to an integrated steering wheel assembly and a method of manufacturing the integrated steering wheel assembly.

Airbags are located beneath a cover of a steering wheel assembly. Historically, the steering wheel was attached to the vehicle, and the airbag was then attached. A cover was then snapped over the airbag.

More recently, integrated steering wheel assemblies have been proposed wherein the steering wheel and airbag are attached to the vehicle as a modular unit. An integrated steering wheel assembly includes a cover, a steering wheel armature, and an airbag. Most covers are formed of a synthetic plastic material that is molded over a portion of the steering wheel armature and the airbag. The airbag is generally installed after the cover has been molded onto the steering wheel armature and may be installed by a manufacturer other than the manufacturer of the steering wheel armature. Thus, it is generally required that the molding process for the cover provide a cavity between the cover and a portion of the steering wheel armature to accommodate installation of the airbag.

Currently, there are two general methods used to provide the cavity for the airbag. The first method is to use a steering wheel assembly that has a two-piece steering wheel armature. In such a system, the cover is molded over the first piece of the armature. Then, the second piece of the armature is secured to the first piece of the armature and a cavity for the airbag is formed between the two pieces of the armature. The second method is to provide a steering wheel armature that includes a support ring. When the cover is molded over such an armature, the support ring supports the cover and creates a cavity for the airbag. Both methods require a lifter mechanism in the cover mold.

Both of these methods have several disadvantages. First, both require a large amount of material to form either the two-piece armature or the armature and hoop. Material cost can be significant because these parts are often formed from magnesium. Second, both methods require that the steering wheel assembly be relatively thick to accommodate the airbag module. Third, adaptability of these methods to changes in the styling of the cover is very low. Generally, changes in the styling of the cover will require modification of the armature tooling, which causes delays and can be expensive. Fourth, both of these methods frequently suffer from the defect of the lifter mechanism in the cover mold producing a read-through line in the cover material. Finally, with the prior methods, it has proven difficult to control the thickness of the cover forwardly of the airbag.

Thus, it is desirable to produce a method and design for an integrated steering wheel assembly that is simpler and that eliminates the additional elements of either a two-piece armature or an armature with a hoop. Such a design would enable a reduction in cost of the integrated steering wheel assembly. It is also desirable to produce an integrated steering wheel assembly that is readily adaptable to changes in styling of the cover without requiring a change in the tooling for the armature. It is furthermore desirable to eliminate read-through lines in the cover material and to simplify the cover mold.

This invention provides a method and an assembly that has a one-piece armature design that is readily adaptable to changes in styling of the cover and that can be produced in a simplified mold without any read-through lines.

SUMMARY OF THE INVENTION

In general terms, this invention provides a simplified integrated steering wheel assembly and a simplified method for producing the integrated steering wheel assembly. The integrated steering wheel assembly includes fewer parts than a typical steering wheel assembly and is readily adaptable to changes in styling of the steering wheel assembly.

Preferably, the integrated steering wheel assembly comprises an airbag scrim and a one-piece steering wheel armature. The steering wheel armature includes a hub portion connected to an outer rim portion by a plurality of spokes. The airbag scrim has a tear seam and is secured to the hub portion of the steering wheel armature. The tear seam is spaced apart from the hub portion when the airbag scrim is secured to the hub portion. The cover material is molded over a portion of the steering wheel armature and a portion of the airbag scrim. The airbag scrim forms a cavity to accommodate an airbag inflator and an airbag between the tear seam and the hub portion.

The method of the invention comprises the steps of positioning the steering wheel armature in a cover mold. The airbag scrim is then positioned on a portion of the steering wheel armature. The airbag scrim is releasably secured on the portion of the steering wheel armature and properly positioned in the cover mold by means of a vacuum force provided through a plurality of positioning pins in the mold. Finally, portions of the steering wheel armature and airbag scrim are covered with a plastic cover material.

This invention permits the manufacturing of an integrated steering wheel assembly having a one-piece steering wheel armature and eliminates the need for a support ring. The invention further provides for an integrated steering wheel assembly that can be readily adapted to changes in styling of the covering without the need to change the tooling of the steering wheel armature. The invention additionally provides for a simplified method of manufacturing the covering for the steering wheel assembly.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
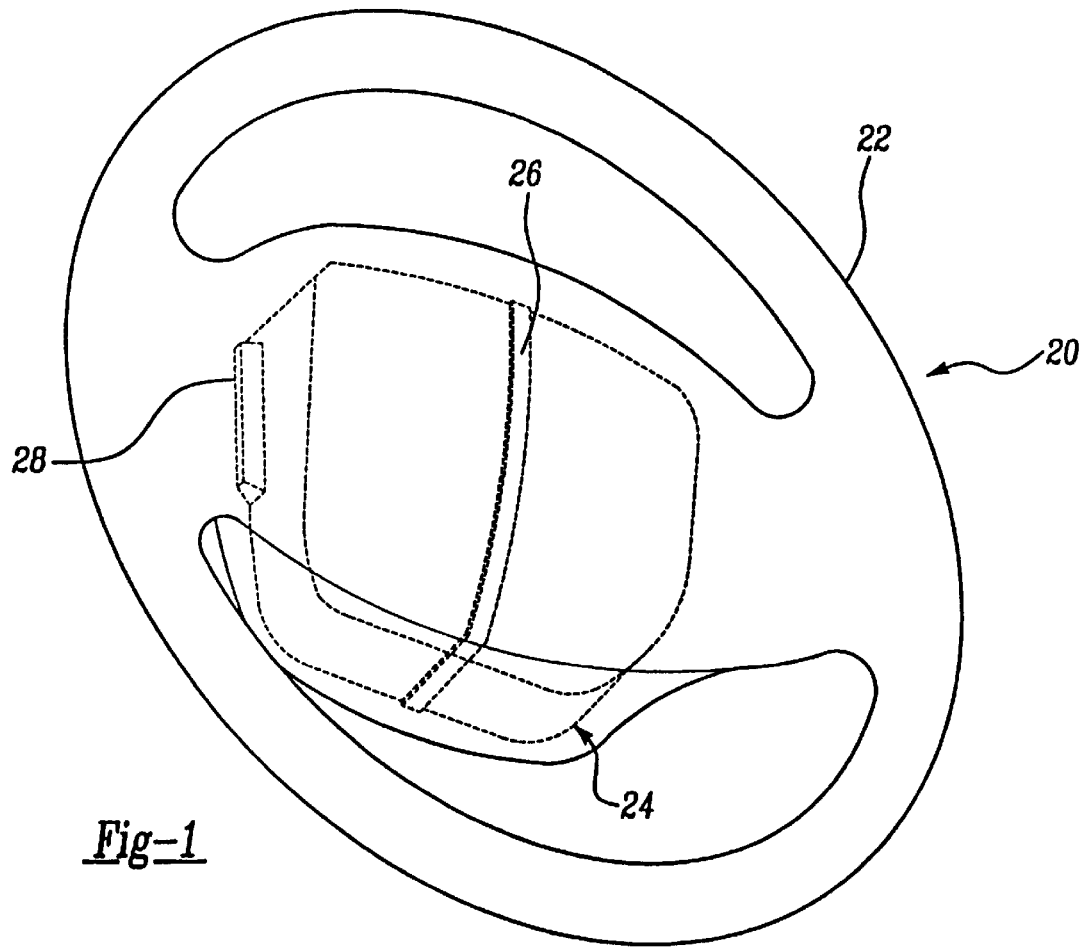
FIG. 1 is a perspective view of an integrated steering wheel assembly, with an airbag scrim shown in phantom, designed according to the present invention.

In FIG. 1, an integrated steering wheel assembly is shown generally at 20. A cover 22 covers the majority of the integrated steering wheel assembly 20. An airbag scrim 24 is shown in phantom. The airbag scrim 24 includes a tear seam 26 and a pair of pockets 28, only one of which is shown.

Figure 2:
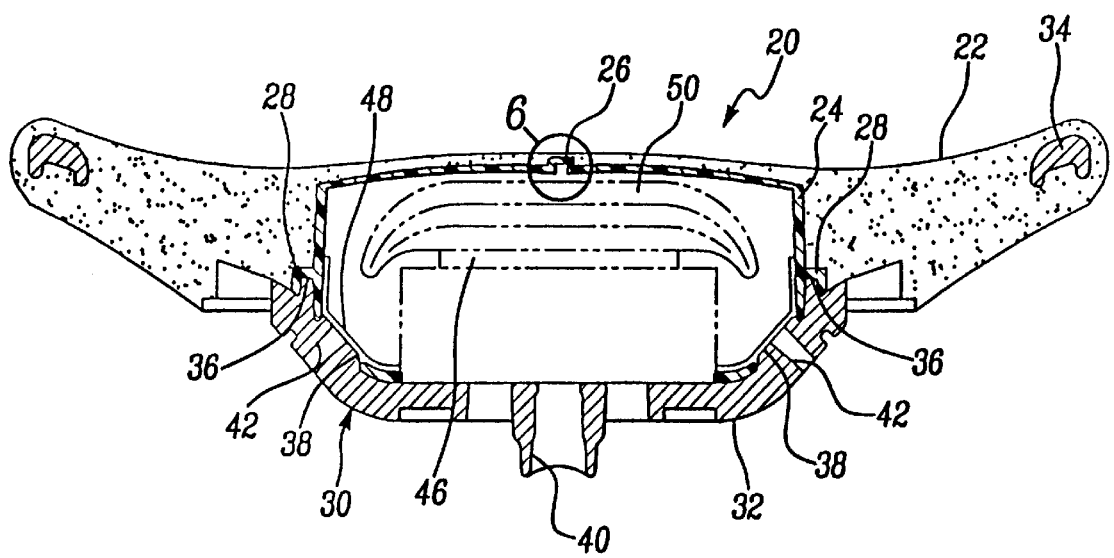
FIG. 2 is a cross-sectional view of the integrated steering wheel assembly.

FIG. 2 is a cross-sectional view of the integrated steering wheel assembly 20. The integrated steering wheel assembly 20 includes a steering wheel armature 30 having a hub portion 32 and an outer rim portion 34. A pair of support tabs 36 and a pair of bosses 38 are located on the hub portion 32. An aperture 40 for the steering column (not shown) is also located on the hub portion 32. A mounting hole 42 is located in each of the bosses 38. Each of the pockets 28 on the airbag scrim 24 fit over one of the support tabs 36. An airbag inflator 46 mounted on a airbag inflator bracket 48 and an airbag 50, all shown in phantom, are located between the airbag scrim 24 and the hub portion 32. The airbag inflator bracket 48 is secured to the hub portion 32 by means of mounting bolts (not shown) that extend through mounting holes 42. The airbag inflator 46 and the airbag 50 are known in the art and form no portion of the present invention. As will be understood by one having ordinary skill in the art, the thickness of the cover 22 over the tear seam 26 would desirably be uniform and thin in order for the airbag inflator 46 to operate properly. The prior art has had difficulty in properly positioning the scrim during molding, and thus has had difficulty achieving uniform thickness.

Figure 3:
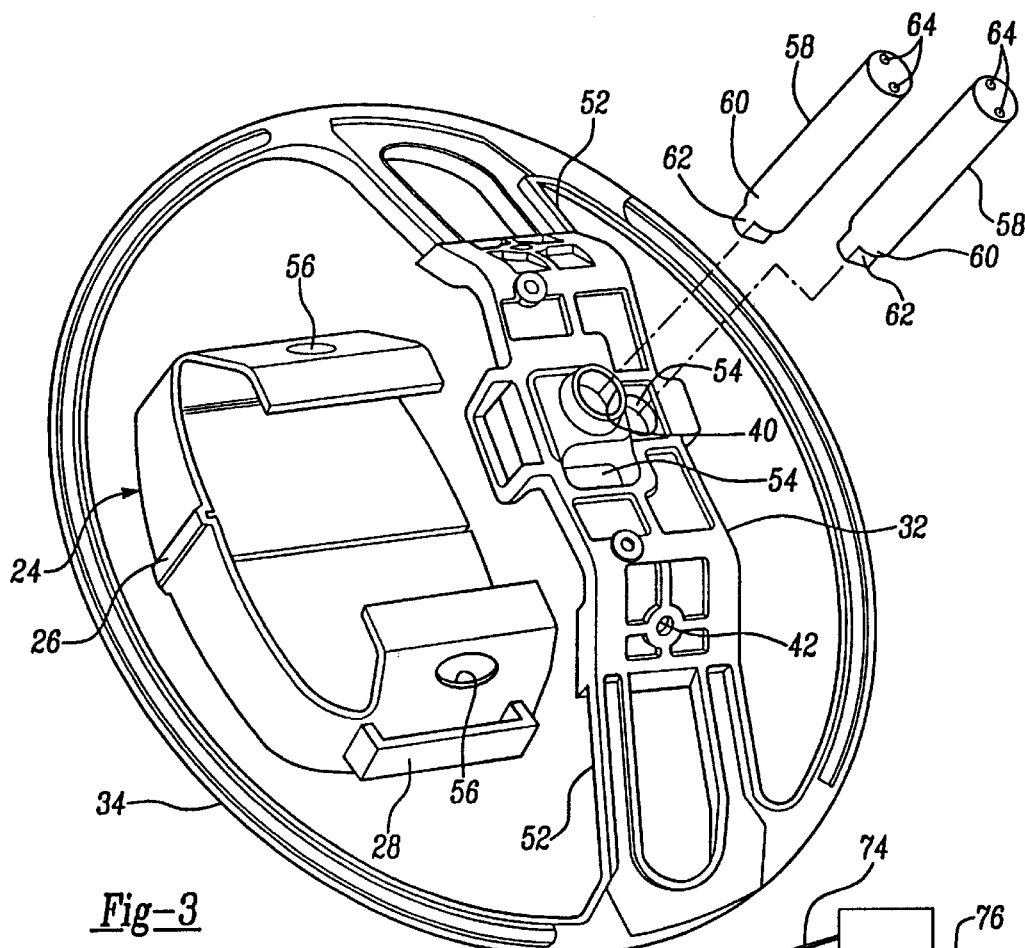
FIG. 3 is an exploded perspective view of the airbag scrim, a steering wheel armature, and a pair of positioning pins.

FIG. 3 is an exploded perspective view of the airbag scrim 24 and the steering wheel armature 30. A plurality of spokes 52 connect the hub portion 32 to the outer rim portion 34. As will be understood by one having ordinary skill in the art, the shape of the spokes 52 and their location may be varied. The hub portion 32 includes a number of tooling apertures 54. A pair of apertures 56 are located on the airbag scrim 24. The apertures 56 are shaped to fit over the bosses 38. A pair of positioning pins 58 are used to position the airbag scrim 24 relative to the hub portion 32 when the cover 22 is being molded. The positioning pins 58 include a first end 60 and a boss 62 located on the first end 60. A pair of vacuum channels 64 extend through each positioning pin 58 to the first end 60.

Figure 4:
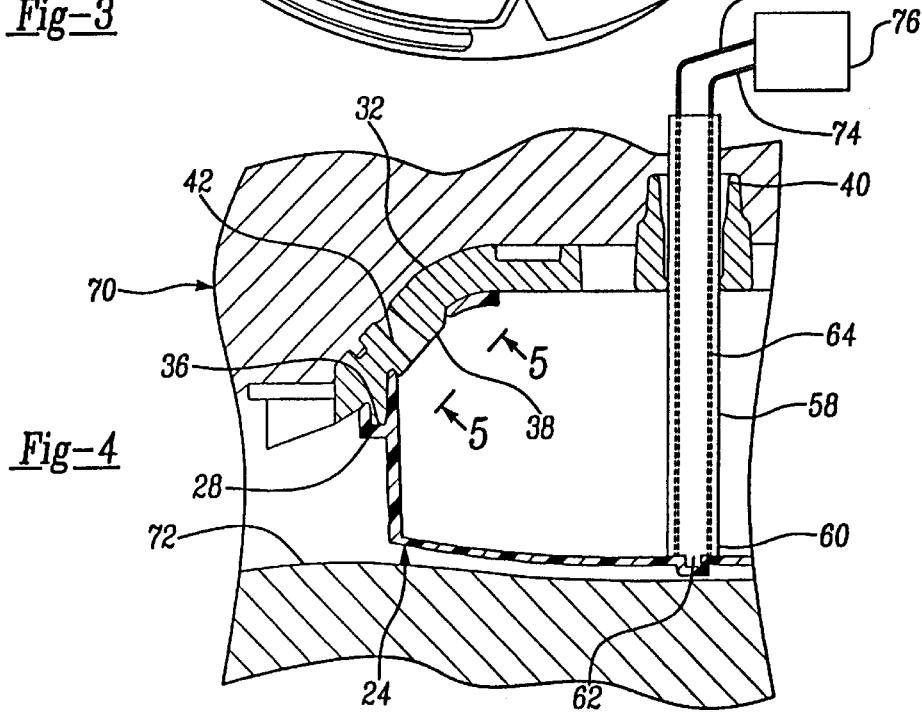
FIG. 4 is a partial cross-sectional view of the steering wheel armature and the airbag scrim in a cover mold.

FIG. 4 is a partial cross-sectional view of the steering wheel armature 30 and the airbag scrim 24 in a cover mold 70 prior to molding of the cover 22. The cover mold 70 includes a cavity 72 having a contour that is the same as the contour of the outer surface of the cover 22. A vacuum line 74 connects each vacuum channel 64 to a vacuum source 76. The vacuum source 76 is of a conventional type known in the art. The boss 62 of each positioning pin 58 preferably extends into the tear seam 26 of the airbag scrim 24. The positioning pins 58 are located in the cover mold 70 to hold the airbag scrim 24 at the appropriate distance from the hub portion 32. When a vacuum from the vacuum source 76 is applied through the vacuum channels 64, the positioning pins 58 hold the airbag scrim 24 against the hub portion 32 while a cover material is added to the cover mold 70. The positioning pins 58 are shown as extending through aperture 40 and tooling aperture 54, as will be understood by one of ordinary skill, positioning pins 58 could extend through other parts of the hub portion 32.

Figure 5:
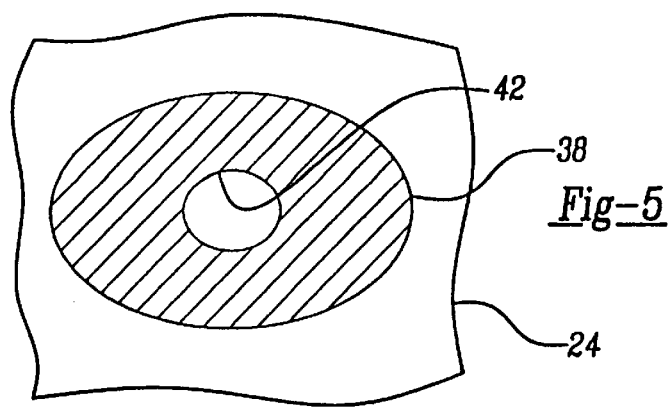
FIG. 5 is an enlarged view of a portion of the airbag scrim and a hub portion of the steering wheel armature.

As shown in FIG. 5, the apertures 56 in the airbag scrim 24 fit over the bosses 38 of the hub portion 32.

Figure 6:
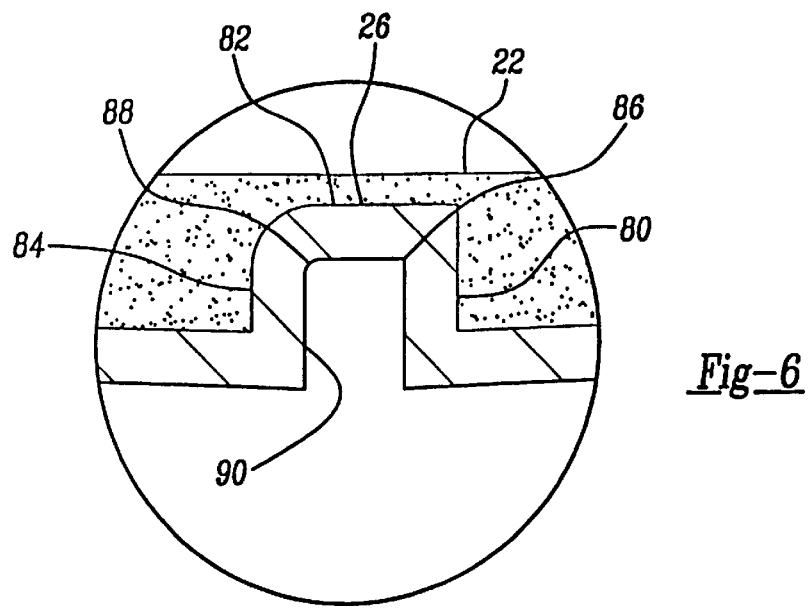
FIG. 6 is an enlarged cross-sectional view of a tear seam on the airbag scrim.

FIG. 6 is an enlarged view of the tear seam 26. The tear seam 26 includes a first wall 80, a second wall 82 and a third wall 84. The second wall 82 is oriented perpendicularly to the first wall 80 and the third wall 84. A substantially 90° joint 86 joins the second wall 82 to the first wall 80. A radiused joint 88 joins the second wall 82 to the third wall 84. The first wall 80, second wall 82 and third wall 84 form a cavity 90. The substantially 90° joint 86 between the first wall 80 and the second wall 82 creates a more fragile joint than the radiused joint 88. Thus, the tear seam 26 is designed such that when the airbag inflator 46 inflates the airbag 50, the tear seam 26 ruptures along the substantially 90° joint 86. When the steering wheel armature 30 is positioned in the cover mold 70, the bosses 62 of the positioning pins 58 are located in cavity 90.

Figure 7:
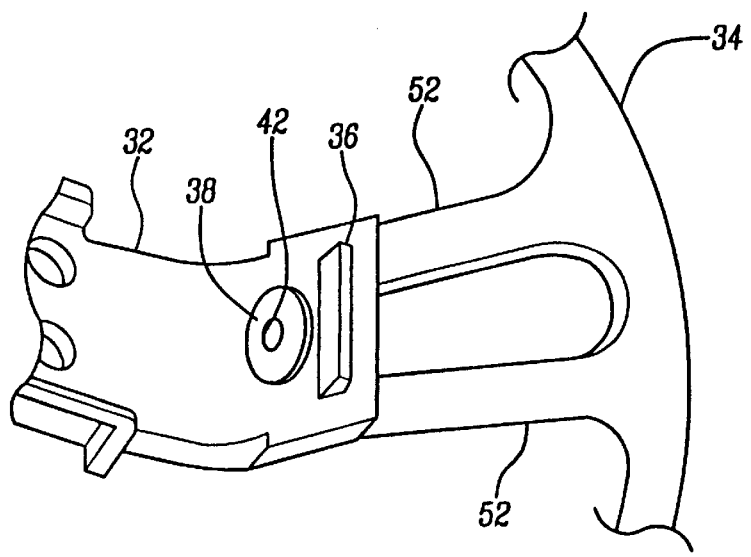
FIG. 7 is a perspective view of a portion of the steering wheel armature.

FIG. 7 is a perspective view of a portion of the steering wheel armature 30. FIG. 7 shows the relationship between the hub portion 32, boss 38, support tab 36, spokes 52, and outer rim portion 34.

As will be understood by one having ordinary skill in the art, the cover 22 could be formed from a wide variety of materials. It is most preferable that the cover 22 be formed from class A urethane. The steering wheel armature 30 is most preferably formed from magnesium, but could also be formed of other materials such as die cast aluminum.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. An integrated steering wheel assembly comprising:
    a steering wheel armature having a hub portion, an outer rim portion and a plurality of spokes extending between said hub portion and said outer rim portion;
    an airbag scrim having an tear seam, said airbag scrim secured to said hub portion, said tear seam spaced apart from said hub portion and extending from said airbag scrim toward a cover; and
    said cover integrally covering a portion of said steering wheel armature and a portion of said airbag scrim including said tear seam;
    wherein said hub portion includes one of a plurality of support tabs and pockets and said airbag scrim includes a plurality of the other of said support tabs and said pockets, each of said pockets receiving one of said support tabs when said airbag scrim is secured to said hub portion, and said support tabs not being movable within said pockets.

2. An integrated steering wheel assembly as recited in claim 1 wherein said support tabs comprises a pair of upwardly extending support tabs located on said hub portion and said plurality of pockets comprises a pair of downwardly extending pockets on said airbag scrim, said tear seam positioned between said pair of pockets.

3. An integrated steering wheel assembly as recited in claim 1 wherein said hub portion includes a plurality of bosses and said airbag scrim includes a plurality of apertures, each of said apertures surrounding one of said bosses when said airbag scrim is secured to said hub portion.

4. An integrated steering wheel assembly as recited in claim 3 wherein said plurality of bosses comprises a pair of oval shaped bosses located on said hub portion and said plurality of apertures comprises a pair of oval shaped apertures, said tear seam positioned between said pair of apertures.

5. An integrated steering wheel assembly as recited in claims 2 wherein said cover comprises urethane.

6. An integrated steering wheel assembly as recited in claim 1 further comprising an airbag and an airbag inflator, said airbag and said airbag inflator located between said airbag scrim and said hub portion and secured to said hub portion.

7. An integrated steering wheel assembly comprising:

a steering wheel armature having a hub portion, an outer rim portion and a plurality of spokes extending between said hub portion and said outer rim portion;

an airbag scrim having a tear seam, said airbag scrim secured to said hub portion, said tear seam spaced apart from said hub portion and extending from said airbag scrim toward a cover; and said cover integrally covering a portion of said steering wheel armature and a portion of said airbag scrim including said tear seam, said cover having a continuous front surface and a rear surface facing said airbag scrim, and said cover having a reduced thickness overlying said tear seam.

8. An integrated steering wheel assembly as recited in claim 7 wherein said cover is molded onto a portion of said airbag scrim.

* * * * *